April 25, 1950   J. F. ELLINGHUYSEN   2,505,280
RIDGE CUTTING ATTACHMENT FOR TRACTOR CULTIVATORS
Filed June 27, 1946   4 Sheets-Sheet 1

INVENTOR
John F. Ellinghuysen
by H. B. Wilson & Co.
Atty.

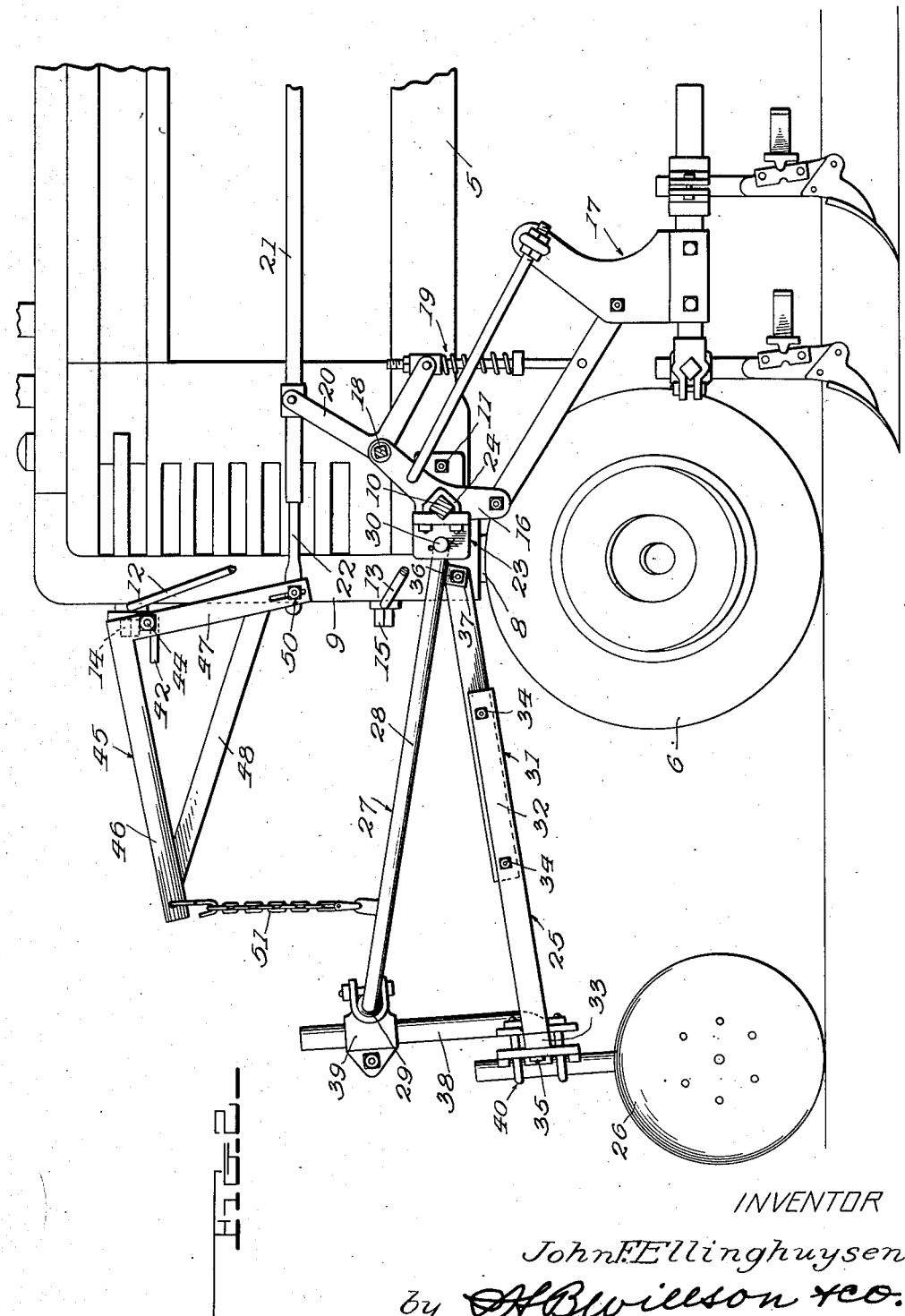

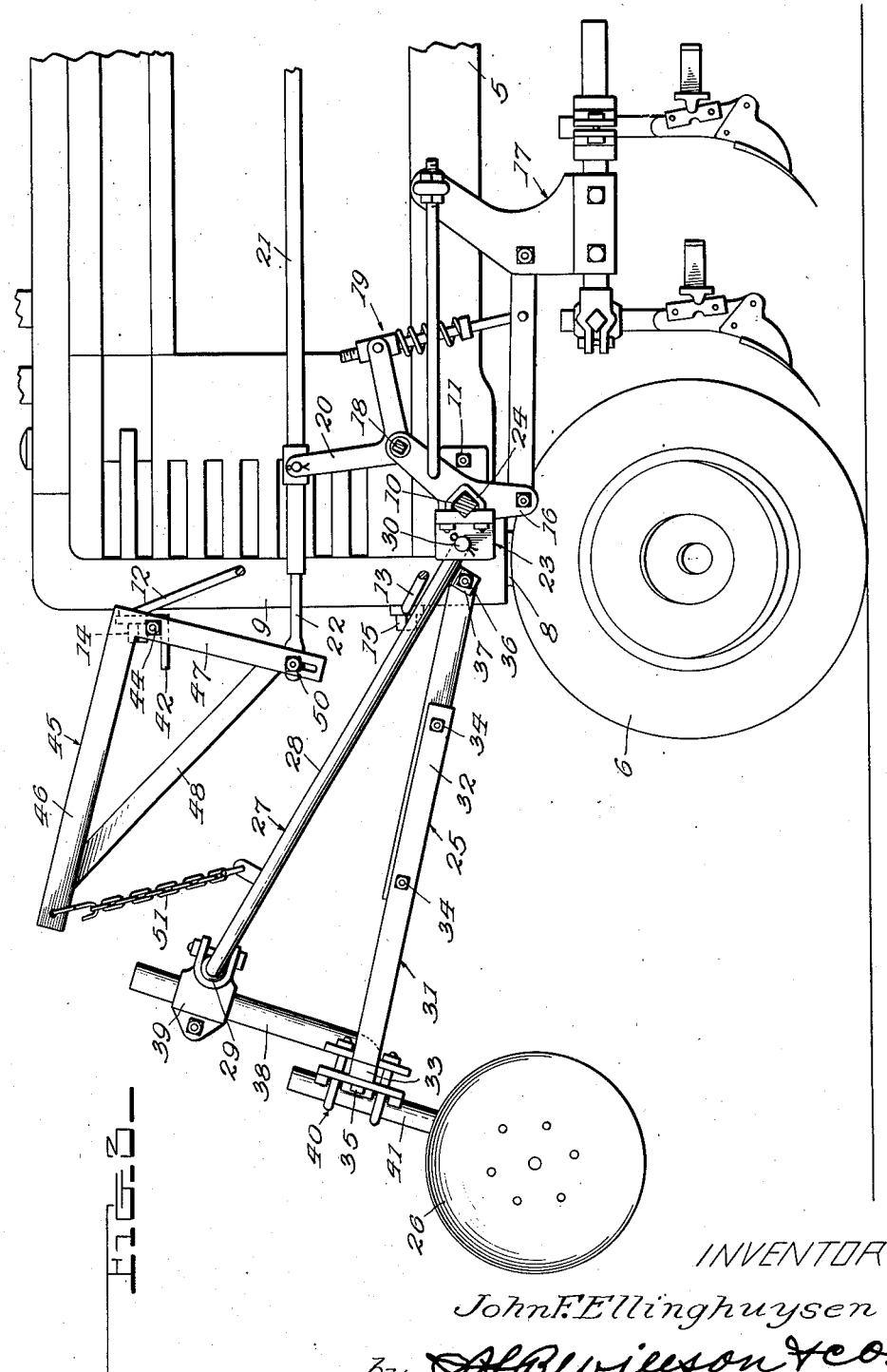

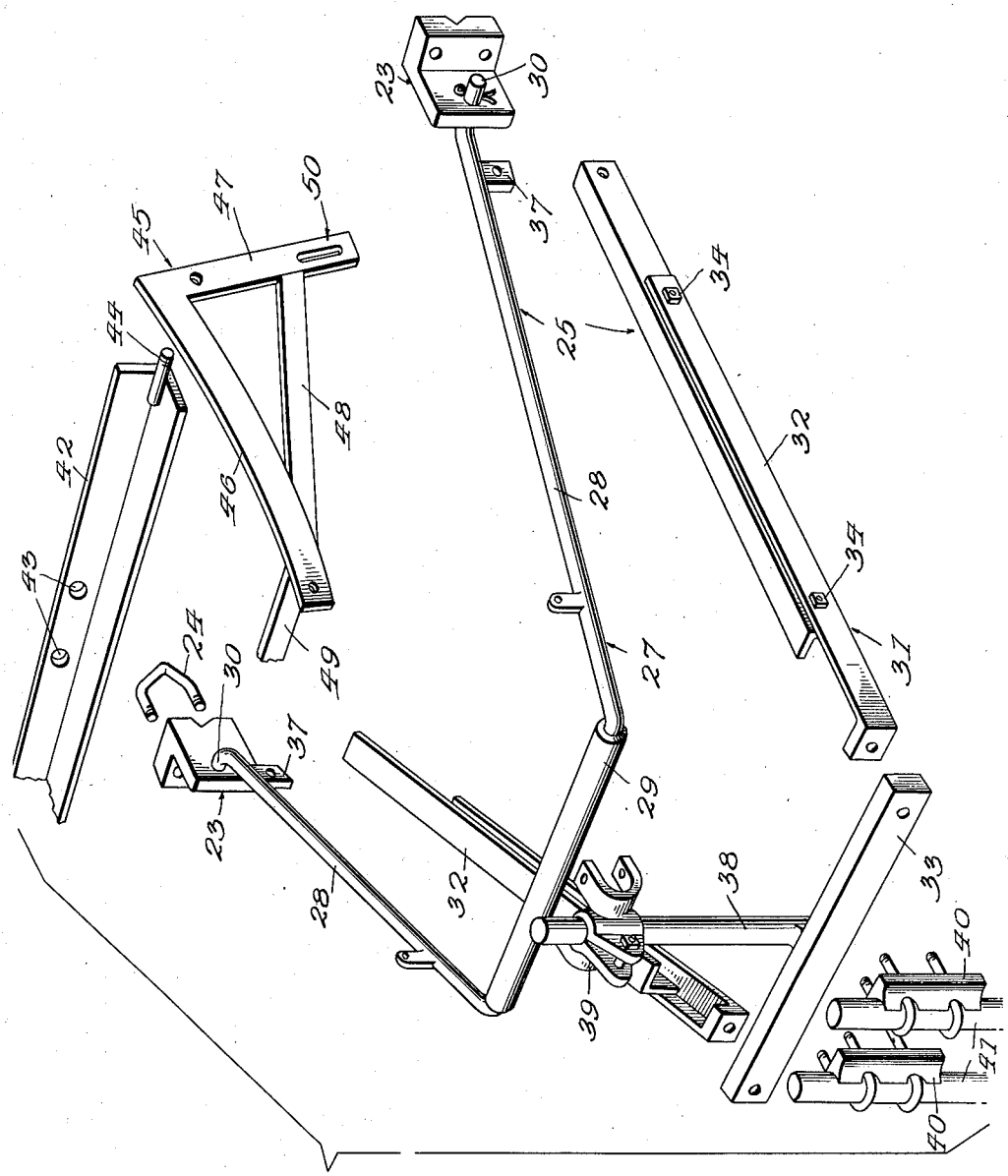

Patented Apr. 25, 1950

2,505,280

UNITED STATES PATENT OFFICE 2,505,280

RIDGE CUTTING ATTACHMENT FOR TRACTOR CULTIVATORS

John F. Ellinghuysen, Hillsdale Township, Winona County, Minn.

Application June 27, 1946, Serial No. 679,714

4 Claims. (Cl. 97—47)

In using tractor cultivators for cultivating crops such as corn, it is customary to first cultivate in one direction and then in a direction transverse to the first direction, making it necessary for the tractor wheels to roll over the ridges previously thrown up by the cultivator rigs. While this is not objectionable with respect to the large rear wheels, it causes the relatively small front wheel or wheels to "bump up and down" so forcibly that it is not only very tiresome for the driver, but interferes with accurate control of the machine. While attachments have been devised intended to cut through the ridges and clear a path for the front wheel or wheels, insofar as I am aware, these devices have never gotten beyond a more or less experimental stage, and such attachments have apparently not been able to cope successfully with the actual conditions encountered. My invention, however, aims to provide a new and improved attachment which will well perform the desired duty, will be simple and inexpensive and will be adequately strong and durable to fulfill all requirements.

Fig. 2 is a side elevation, partly in section, showing the ridge cutting disks and the cultivator rigs lowered to operative positions.

Fig. 3 is a view similar to Fig. 2 but illustrating the manner in which the rigs and the disks are simultaneously raised.

Fig. 4 is a fragmentary disassembled perspective view showing a number of the parts of the attachment.

Figure 1:
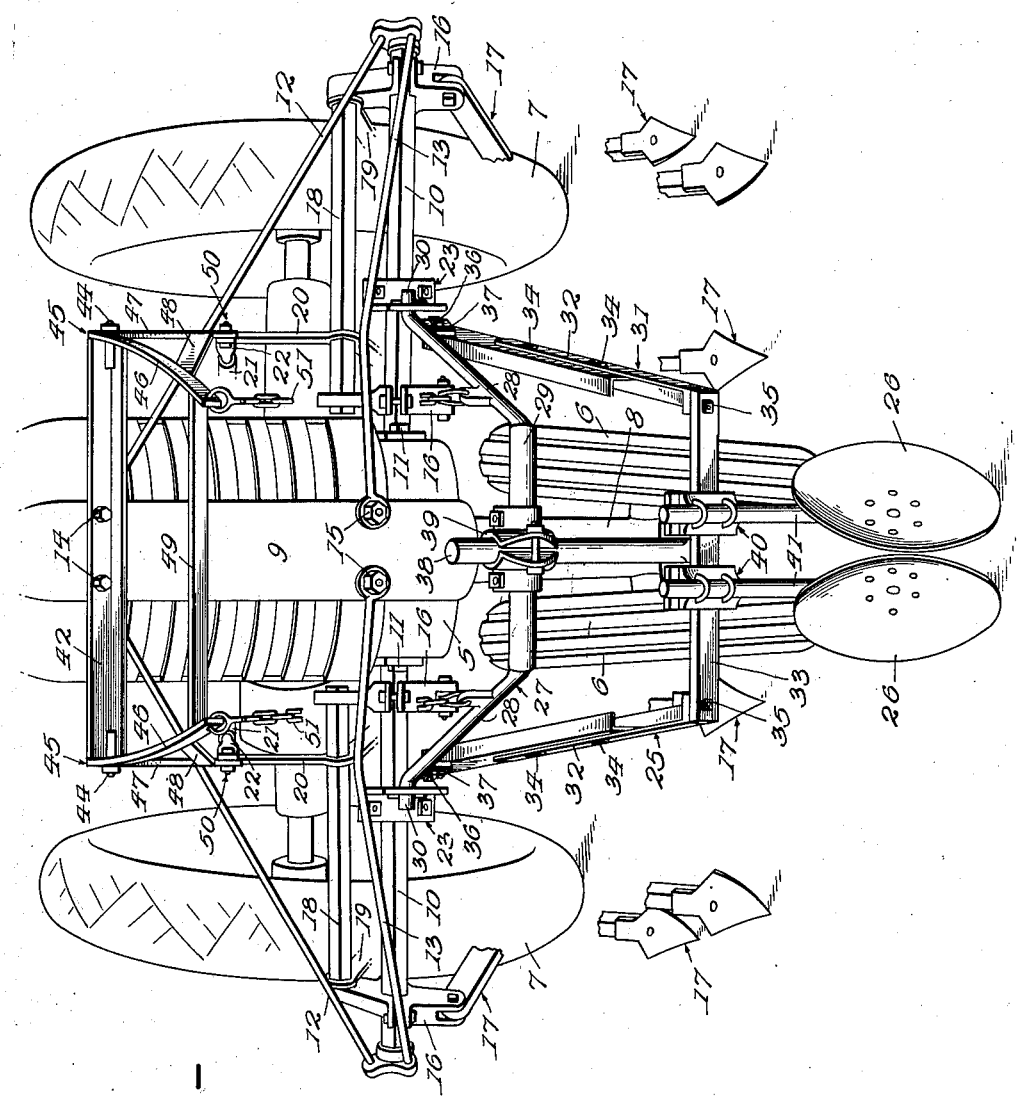
Figure 1 is a front perspective view, partly broken away, showing a tractor cultivator equipped with the ridge cutting attachment.

Preferences have been disclosed in the drawings and will be rather specifically described, with the understanding, however, that variations may be made within the scope of the invention as claimed.

The tractor cultivator for which the attachment is designed, includes a chassis frame 5, front and rear wheels 6 and 7, a steering column 8 supported by the front wheels 6, and a rigid upstanding post or the like 9 receiving the upper portion of said steering column. While two front wheels 6 are shown, the attachment is equally applicable to tractor cultivators having only one front wheel.

Two rig-mounting bars 10 are fixedly secured at 11 to the front end portion of the chassis frame 5 and project laterally in opposite directions therefrom, the outer ends of said bars 10 being connected with the post 9 by upper and lower brace rods 12 and 13 which are secured to said post 9 by the conventional means 14 and 15 consisting of bolts, screws or the like. The bars 10 rigidly carry the customary brackets 16 to which the usual cultivator rigs 17 are pivotally connected for raising and lowering. The brackets 16 also carry rock shafts 18 appropriately connected at 19 with the rigs 17 for raising and lowering these rigs when said shafts are properly rocked. The shafts 18 are provided with upwardly projecting arms 20 which are pivoted to a pair of longitudinal rig-adjusting rods 21 disposed at opposite sides of the machine and extending rearwardly to conventional operating means (not shown). I utilize these rods 21 to raise and lower the ridge-cutting attachment as the cultivator rigs 17 are raised and lowered, and in order to accomplish this, I provide said rods with forwardly projecting extensions 22 which may be welded thereto. The manner in which these extensions operate will be hereinafter made clear.

I provide two brackets 23 for mounting on the two bars 10 respectively, said brackets having attaching clamps 24 to embrace said bars. The rear end of a vertically swingable frame 25 is pivoted to the brackets 23, and the front end of this frame 25 carries two ridge-cutting disks 26 in advance of the wheels 6. This frame 25 includes an upper U-shaped frame 27 whose side arms 28 project rearwardly from its arm-connecting portion 29, the rear ends of said side arms 28 being bent outwardly to provide trunnions 30 which connect them with the brackets 23. The frame 25 also includes a lower U-shaped frame 31, the side arms 32 of which project rearwardly from the arm-connecting portion 33. Each side arm 32 may well be formed from sections bolted together at 34, and the arm-connecting portion 33 is preferably in the form of a short rigid bar bolted at 35 to the front ends of said side arms 32. The rear ends of these side arms are rigidly bolted at 36 to lugs 37 projecting downwardly from the side arms 28 of the upper U-shaped frame 27. A rigid vertical shank 38 is welded at its lower end to the bar 33 and is connected by a suitable clamp 39 to the arm-connecting bar 29, completing the construction of the frame 25, which frame, it will be observed, is of very strong and durable construction. The disks 26 are connected with the frame by means of appropriate clamps 40 which secure the upwardly projecting disk shanks 41 to the arm-connecting bar 33 of the lower U-shaped frame 31.

An angle metal bar 42 is secured between its ends to the post 9 by means of the screws or the like 14, and said bar projects laterally in opposite directions from said post. The central portion of this bar is formed with openings 43 to receive the screws or the like 14, and the ends of said bar are provided with projecting pivot studs 44 preferably welded thereto. By means of these pivot studs, two bell cranks 45 are pivotally mounted on the ends of the bar 42, each of said bell cranks having a forwardly projecting arm 46 and a downwardly projecting arm 47.

The two arms 46 and 47 are preferably connected by a suitable brace 48, and the arms 46 of the two bell cranks 45 are rigidly connected by a transverse bar 49 which may be welded thereto. The lower ends of the arms 47 are connected with the extensions 22 of the rig-adjusting rods 21, by suitable bolt-and-slot connections 50, and the front ends of the arms 46 are connected with the side arms 28 of the upper U-shaped frame 27 by means of suspenders 51 preferably in the form of chains. When the rods 21 are moved rearwardly to effect lowering of the cultivator rigs 17, the bell cranks 45 are moved to lower the entire frame 25, thus lowering the disks 26 to operative position. When the rods 21 are forwardly moved, however, to raise the rigs 17, the bell cranks 45 are operated to effect raising of the frame 25, disposing the disks 26 well above the ground when the machine is to be driven from place to place.

From the foregoing, taken in connection with the accompanying drawings, it will be seen that novel and advantageous provision has been made for attaining the desired end, that is, cutting through the ridges formed by cultivating in one direction, while cultivating at right angles to said one direction, thus forming a relatively smooth path for the front wheels 6 and preventing the excessive up and down movement of the tractor cultivator which has heretofore been tiresome to the driver and has interfered with accurate control of the machine.

Attention is again invited to the possibility of making variations within the scope of the invention as claimed, even though preferences have been disclosed and specifically described.

I claim:

1. A ridge cutting attachment for a tractor cultivator of the type including a chassis frame having an upstanding rigid post at its front end, a front wheel supporting said front end of said chassis frame, two rigid rig-mounting bars projecting laterally from opposite sides of said chassis frame, cultivator rigs pivotally connected with said rig-mounting bars, and means for raising and lowering said rigs, including two longitudinal rig-adjusting rods at opposite sides of said chassis frame, said rods being movable forwardly to raise said rigs and rearwardly to lower said rigs; said attachment comprising two brackets having clamps for securing them to the rig-mounting bars of the tractor cultivator, a vertically swingable frame pivoted at its rear end to said brackets, ridge-cutting means mounted on the front end of said vertically swingable frame for disposition in advance of the front wheel of the tractor cultivator, a horizontal bracket bar having means adapting it for mounting on the upstanding post of the tractor cultivator, two vertically swingable bell cranks pivoted to the ends of said bracket bar respectively, each of said bell cranks having a forwardly projecting arm and a downwardly projecting arm, means connecting said bell cranks for simultaneous movement, suspenders connecting said forwardly projecting arms with said vertically swingable frame, and means for connecting said downwardly projecting arms with the rig-adjusting rods of the tractor cultivator.

2. In a ridge-cutting attachment for a tractor cultivator, an upper U-shaped frame the side arms of which project rearwardly from its arm-connecting portion, a lower U-shaped frame the side arms of which also project rearwardly from its arm-connecting portion, said side arms of said upper U-shaped frame being secured at their rear ends to the rear ends of said side arms of said lower U-shaped frame, a central vertical shank rigidly secured at its lower end to said arm-connecting portion of said lower U-shaped frame and rigidly secured at its upper end to said arm-connecting portion of said upper U-shaped frame, two ridge-cutting members under said arm-connecting portion of said lower U-shaped frame, shanks carrying said ridge-cutting members, clamps securing these shanks to said arm-connecting portion of said lower U-shaped frame, brackets to which the connected rear ends of said U-shaped frame are pivoted for vertical swinging, said brackets having attaching clamps, and means for raising and lowering said U-shaped frames.

3. A ridge cutting attachment for a tractor comprising a frame including upper and lower members, means for pivotally mounting the upper member upon a tractor, said lower member being pivoted at its rear end to the rear end of said upper member and tiltable vertically to adjusted positions, a shank projecting upwardly from the front of said lower member, a coupler connecting said shank with said upper member and releasably securing the lower member in a vertically adjusted position relative to the upper member, ridge cutting means supported downwardly from said lower member, and means for tilting said upper member vertically to adjusted positions and supporting both of said members in a desired position of suspension.

4. A ridge cutting attachment for a cultivator comprising an upper frame having a cross bar and arms extending rearwardly therefrom, brackets adapted to be secured to a tractor, said frame having rear ends of its arms pivoted to said brackets for vertical swinging movement of said frame, a lower frame having a cross bar and arms extending rearwardly therefrom and having their rear ends pivoted to the rear portions of the arms of the upper frame for vertical swinging movement of said lower frame, ridge cutting means supported downwardly from said lower frame, a shank rising from the cross bar of said lower frame and projecting upwardly across the cross bar of the upper frame, a coupling carried by the cross bar of said upper frame and releasably secured about said shank and serving to releasably secure the lower frame in a vertically adjusted position relative to the upper frame, and means for tilting the upper frame vertically and supporting both frames and the ridge cutting means in an adjusted position.

JOHN F. ELLINGHUYSEN.

REFERENCES CITED

The following references are of record in the file of this patent:

UNITED STATES PATENTS

| Number | Name | Date |
| --- | --- | --- |
| 1,262,966 | Mahon | Apr. 16, 1918 |
| 1,383,409 | Liddell | July 5, 1921 |
| 1,798,958 | Smethers et al. | Mar. 31, 1931 |
| 1,868,307 | Brown | July 19, 1932 |
| 2,179,793 | Lewison | Nov. 14, 1939 |
| 2,339,468 | Ego | Jan. 18, 1944 |
| 2,347,373 | Silver | Apr. 25, 1944 |